Nov. 10, 1936.  S. J. HARLEY  2,060,437
ELECTRIC MOTOR CONTROL
Filed Sept. 4, 1934  3 Sheets-Sheet 1

Inventor:
Stanley J. Harley
by Richard L. Babcock
Attorney

Nov. 10, 1936.    S. J. HARLEY    2,060,437
ELECTRIC MOTOR CONTROL
Filed Sept. 4, 1934    3 Sheets-Sheet 3

Inventor:
Stanley J. Harley
by Richard L. Babcock
Attorney.

Patented Nov. 10, 1936

2,060,437

UNITED STATES PATENT OFFICE 2,060,437

ELECTRIC MOTOR CONTROL

Stanley Jaffa Harley, Stivichall, Coventry, England

Application September 4, 1934, Serial No. 742,699
In Great Britain September 7, 1933

1 Claim. (Cl. 172—239)

This invention relates to machining operations in which the work is rotated and has for its object to vary the rotational speed at any instant during each revolution of the work. There are many cases where this would be an advantage. For example, in grinding screw thread taps a saving in actual machining time can be effected by increasing the rotational speed of the tap during the time a fluate passes the grinding wheel. The difficulty which is at present experienced in obtaining a satisfactory finish on work of irregular or non-circular profile, such as cams, can be also avoided by varying the rotational speed of the work so that the peripheral speed remains constant irrespective of the radial distance at any point on the periphery from the axis of rotation.

Where the work is rotated by means of a variable speed D. C. electric motor there is associated with the speed controlling means therefor, according to this invention, a device which automatically determines the rotational speed at any instant according as the peripheral speed of the work is to be accelerated or reduced during certain periods of each revolution or is to be maintained constant notwithstanding that a certain part or parts of the periphery is or are at a greater radial distance from the axis of rotation than another or others.

The said device may take the form of a rotary switch having a series of insulated contacts adapted to be connected across the speed regulating resistance of the motor, the movable contact of the switch being rotated at a speed which bears a definite relation to the rotational speed of the work.

The speed of the motor may also be controlled, in accordance with the requirements dictated by the nature of the periphery of the work, by means of a cam the profile of which will vary according to the cross-sectional shape of the work and to its speed of rotation relatively to that of the latter, said cam being operative to make and break the circuit of the speed regulating resistance at the required times during each revolution of the work.

Where an electric motor of the A. C. type is used to drive the work the said device may operate to short-circuit certain of the field windings or to make and break the circuits of the exciting coils of contactors serving the high and low speed windings of the motor, the effect in either case being to increase or reduce the rotational speed of the motor and hence the peripheral speed of the work at any moment.

In the accompanying drawings.

Figure 1:
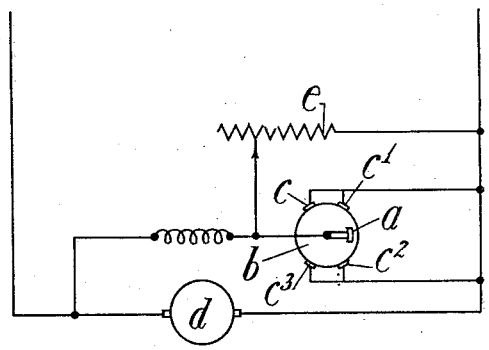
Figure 1 is a diagram illustrating one method of controlling the speed of the driving motor for the purposes of the present invention.

In the arrangement shown in Figure 1 the movable contact $a$ of the rotary switch $b$ may be driven at the same rotational speed as the work, in which case the switch will be provided with a number of fixed contacts according to the nature of the peripheral surface of the work. For the purpose of grinding screw thread taps and other fluted work, for example, the movable contact, if rotated at the same speed as the work, will make successive contact with a series of fixed contacts $c$, $c^1$, $c^2$, $c^3$ corresponding with the number of flutes in the tap and of a proportional angular extent. Where the motor $d$ is of the D. C. type these contacts are each electrically connected with one end of the speed regulating resistance $e$, a variable point in which is connected with the movable contact $a$ rotating in synchronism with the work, so that each time a land of the tap comes into contact with the grinding wheel the regulating resistance is short-circuited, and the tap is rotated at the proper speed for grinding purposes. Immediately a flute of the tap reaches the grinding wheel the switch operates to break the short-circuit and to introduce a variable part of the resistance $e$ into the shunt field circuit thereby causing an instantaneous increase in the rotational speed of the tap. The switch may, however, be provided with a single stationary contact and the movable contact driven so as to make one complete revolution for each flute in the work.

Figure 2:
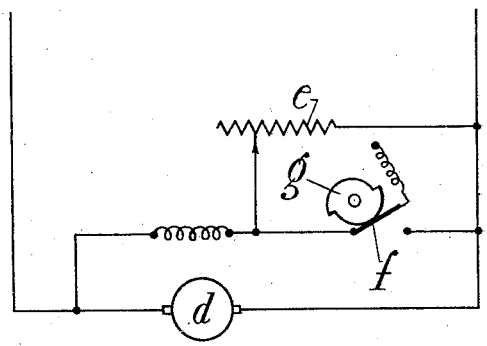
Figure 2 is a similar diagram illustrating an alternative method.

In the preferred arrangement shown diagrammatically in Figure 2, the regulating resistance $e$ in the shunt field circuit of the motor $d$ is adapted to be short-circuited at the required times during each revolution of the work by the closing of a switch $f$. This switch is closed against the action of a spring by means of a cam $g$ which, if driven at the same speed of rotation as the work, will have as many cam profiles as the number of times it is required to short-circuit the regulating resistance during each revolution of the work. That is to say, in grinding a tap having two flutes the cam will have two cam profiles. The form of the cam profiles will be such as to hold the switch closed during the time a flute of the tap is passing the grinding wheel and this period or angular extent may be varied in the manner hereinafter described.

Figure 3:
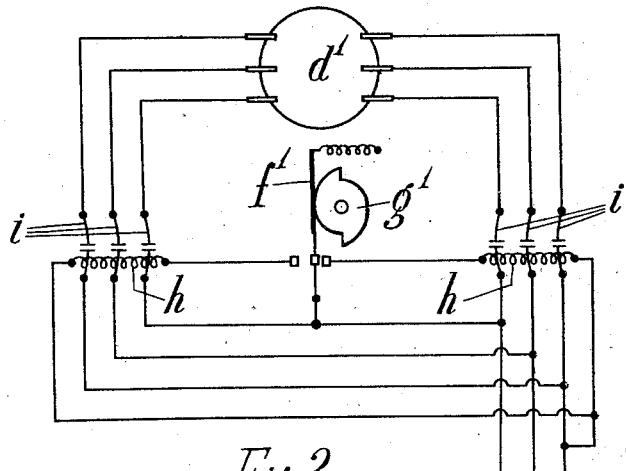
Figure 3 is a diagram illustrating a method of speed control which may be adopted with a motor of the multi-polar alternating type.

In the arrangement represented diagrammatically in Figure 3 in which a three-phase motor $d'$ is employed, a spring-loaded switch $f'$ is operated by a cam $g'$ to make and break the circuits of the exciting coils $h$ of triple pole contactors $i$ serving the high and low speed windings of the motor $d'$, thereby increasing or reducing the speed of the motor and hence the peripheral speed of the work.

In grinding a tap having two flutes, for example, the cam will be driven at the same rotational speed as the work and will have, as shown, two cam profiles each of which operates to move the switch in a direction to break the circuit of the exciting coil of the triple pole contactor serving the low speed windings of the motor and to close the circuit of the exciting coil of the triple pole contactor serving the high speed windings of the motor the speed of which will then be increased during the time the switch remains closed, that is to say, during the time a flute of the tap is passing the grinding wheel. Any suitable type of interlock may be employed to prevent both contactors being closed at the same time.

The invention is also applicable where the speed of a D. C. motor is controlled by means of an electrical system, such as is represented diagrammatically in Figure 4, in which the circuits of the field windings of a generator G and of the work-driving motor $d$ are both supplied with current from an exciter C which, together with the generator may be directly coupled to a main motor M. In this case a cam $g^2$ may be arranged to operate switches $f^2$, $f^3$ which, when closed, short-circuit adjustable speed regulating resistances $e^1$, $e^2$ in the field circuits of the generator and motor. In this case the variation obtained in the rotational speed of the work will depend upon the relative adjustment of the two resistances $e^1$ and $e^2$, the tendency, when the switches $f^2$ and $f^3$ are closed, for the resulting increase in the excitation of the generator G to increase the speed of the motor $d$ being to a variable extent off-set by the tendency of the simultaneous increase in the motor excitation to reduce the speed of said motor.

Figure 5:
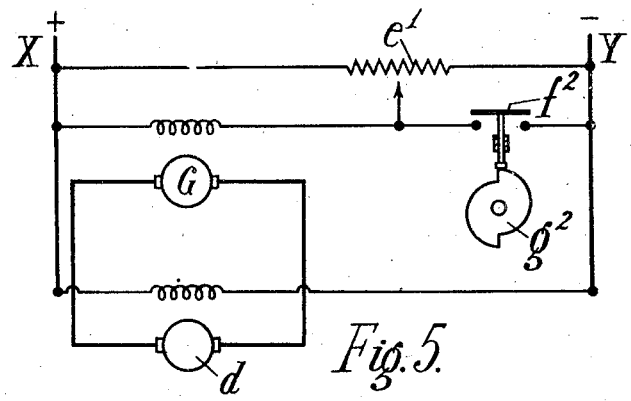

Where, as shown in Figure 5, the speed of the motor $d$ is controlled by means of a variable resistance $e^1$ in the field circuit of the generator G only, the cam $g^2$ will operate to close the switch $f^2$ to short-circuit the resistance at such times when it is required to increase the speed of the motor and hence the peripheral speed of the work. The field circuits of generator and motor may, as shown in this figure, be both supplied with current direct from the mains X, Y instead of by means of an exciter.

Figure 4:
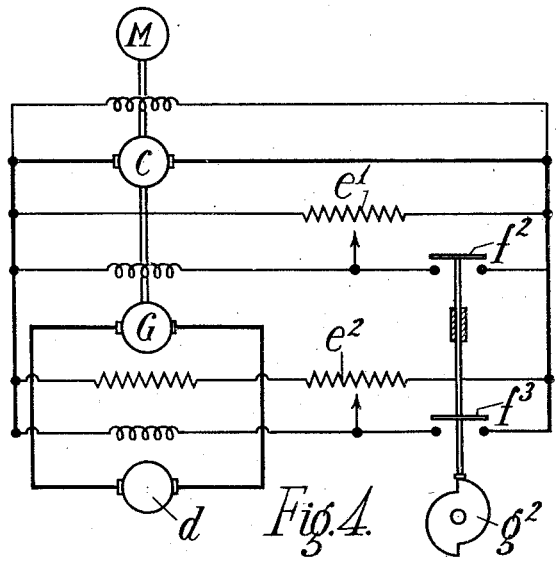
Figures 4, 5 and 6 are diagrams illustrating further alternative methods of controlling the speed of the driving motor.
Figure 6:
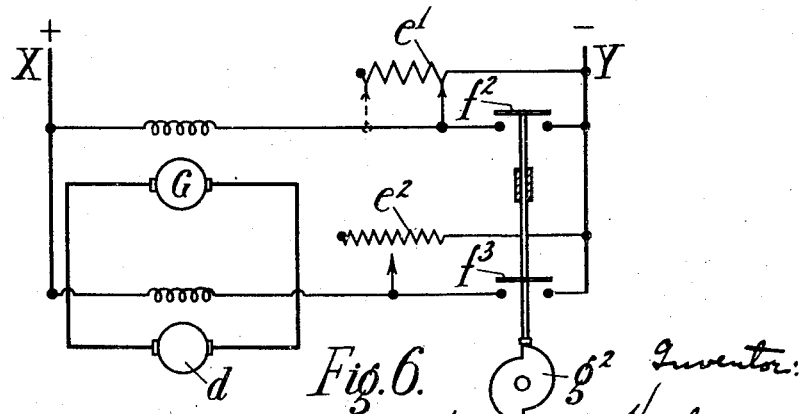

Figure 6 illustrates a similar arrangement to that shown in Figure 4 except that in this case the speed regulating resistances $e^1$, $e^2$ are each connected in series with the field windings of the generator G and motor $d$ respectively.

Figure 7:
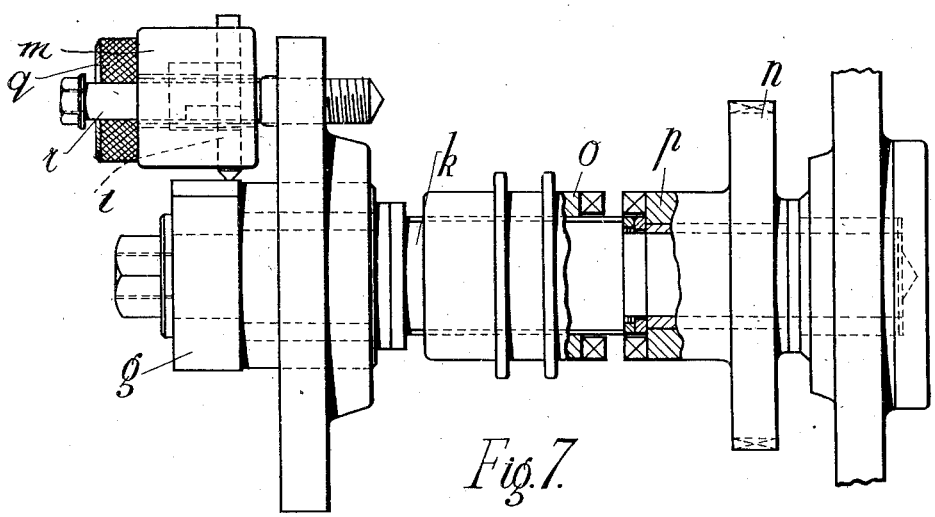
Figures 7 and 8 are two views taken at right angles to each other showing one practical application of the invention.
Figure 8:
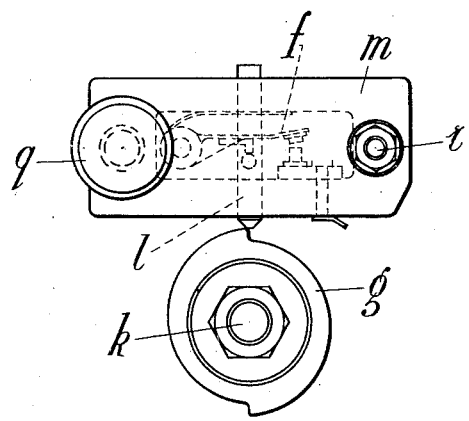

In the constructional form shown in Figures 7 and 8 as applied to a grinding machine, the speed controlling cam $g$ is fixed to a spindle $k$ rotatably mounted in the headstock of the machine and is adapted to open the switch (or switches) $f$ against the action of a spring by means of a plunger $l$ slidably mounted in the switch housing $m$ and bearing at one end upon the cam.

The cam spindle is driven by a gear wheel $n$ which is loosely mounted thereon in operative driving connection with the work spindle and may itself be driven at any desired ratio from the usual lead screw by means of which the work is traversed across the face of the grinding wheel.

In order to enable the cam to be cut out of operation, as when grinding a cylindrical portion of the work, the spindle $k$ is splined to receive a sliding clutch member $o$ adapted to be moved into and out of engagement with a corresponding clutch member $p$ on the said gear wheel.

Figures 9, 10:
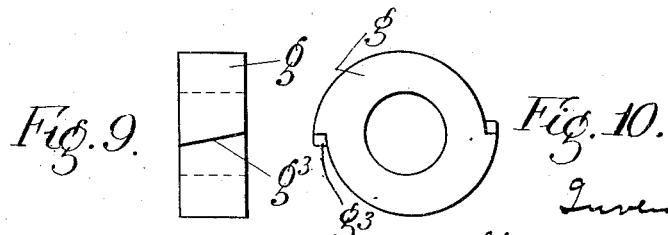
Figures 9 and 10 are edge and side views respectively of the cam.

To provide for variation in the relative periods of time during which the peripheral speed of the work is required to be accelerated and reduced during each revolution, the shoulders $g^3$ of the cam are formed, as shown in Figures 9 and 10, with helical faces and provision is made for relative movement between the cam and the plunger $l$ in the direction of the rotational axis of the said cam. For this purpose the switch housing is made movable in the direction of said axis under the influence of an adjusting screw $q$ and is guided by means of a fixed pin $r$ on the headstock.

It will of course be obvious that the invention is applicable to machining operations in all cases where the rotating work has a non-circular or interrupted peripheral surface, and is not confined to the grinding operation of fluted taps. In some cases, as for example, in the machining operation of cams, the rotational speed of the work may require to be gradually reduced and then accelerated for a similar or different period and afterwards maintained constant for the remainder of each revolution so that the peripheral speed of the work is at all times constant.

In such a case the profile of the speed controlling cam may be a replica of that of the cam or other work being machined, and may be arranged to actuate a movable contact along a regulating resistance in the field circuit of the motor.

I claim:—

In a machine for operating on the non-circular or interrupted peripheral surface of rotating work, a motor for driving the work, means for controlling the rotational speed of the motor, a cam for operating said speed controlling means said cam having helically formed shoulders, and means for relative adjustment between the cam and said speed controlling means in the direction of the rotational axis of said cam.

STANLEY JAFFA HARLEY.